United States Patent [19]

McVicker

[11] Patent Number: 5,506,583
[45] Date of Patent: Apr. 9, 1996

[54] FREQUENCY RANGE GATE CLOSURE

[75] Inventor: Bruce P. McVicker, Palmdale, Calif.

[73] Assignee: Hughes Aircarft Company, Los Angeles, Calif.

[21] Appl. No.: 411,255

[22] Filed: Mar. 27, 1995

[51] Int. Cl.$^6$ ..................................................... G01S 13/90
[52] U.S. Cl. .............................. 342/25; 342/162; 342/194; 342/195
[58] Field of Search ..................................... 342/103, 159, 342/160, 162, 190, 191, 194, 195, 197, 25

[56] References Cited

U.S. PATENT DOCUMENTS

| | | | |
|---|---|---|---|
| 5,003,314 | 3/1991 | Berkowitz et al. | 342/372 |
| 5,019,793 | 5/1991 | McNab | 333/156 |
| 5,034,703 | 7/1991 | Schumacher | 331/2 |
| 5,223,840 | 6/1993 | Cronyn | 342/170 |
| 5,303,412 | 4/1994 | Kushner | 455/260 |
| 5,361,072 | 11/1994 | Barrick et al. | 342/133 |

Primary Examiner—John B. Sotomayor
Attorney, Agent, or Firm—Leonard A. Alkov; W. K. Denson-Low

[57] ABSTRACT

A frequency range gate closure circuit for use in synthetic aperture radars that incorporate a digital waveform generator or direct digital synthesizer that improves the mapping resolution of the radars. Range gate closure motion compensation is more accurately implemented using the present circuit. The digital waveform generator or direct digital synthesizer is clocked by a system clock, and processes control words corresponding to a desired slope of the stretch frequency modulation of transmitted radar signals, to generate frequency modulated pulse output signals. The range gate closure circuit includes a digital data accumulator for receiving an increment value and a pulse repetition frequency value of the radar. Logic circuitry is coupled to an output of the digital data accumulator and is coupled to receive a digital modulo threshold signal and output the increment value when it is less than the digital modulo threshold signal every pulse repetition interval. The difference between the digital modulo threshold signal and the increment value is coupled to the digital data accumulator to reset it when the increment value is less than the digital modulo threshold signal. A coarse time delay counter is coupled to the logic circuitry for counting desired coarse time delays needed by the circuit. The frequency range gate closure circuit decrements a frequency offset of a local oscillator frequency sweep by the increment value every pulse repetition interval until the frequency offset is less than the digital modulo threshold signal so that the frequency offset is equal to the expected Doppler frequency error.

6 Claims, 5 Drawing Sheets

| LOAD | RESET | PRESET | $D_{IN}$ | CLK | $D_{OUT(i)}$ |
|---|---|---|---|---|---|
| 0 | 0 | ∅ | D | ⎍ | Dout(i-1)+D |
| ∅ | 1 | ∅ | ∅ | ∅ | 0 |
| 1 | 0 | P | ∅ | ⎍ | P |

∅ = DON'T CARE

INCREMENT COARSE TIME DELAY 5,506,583

FREQUENCY RANGE GATE CLOSURE

BACKGROUND OF THE INVENTION

The present invention relates to synthetic aperture radars, and more particularly, to frequency range gate closure circuitry for use in synthetic aperture radars that improves mapping resolution.

When an airborne radar is used to form a synthetic aperture (or array) radar (SAR) for high resolution ground mapping, the uncompensated motion of the radar-bearing aircraft will degrade the map resolution. In particular, the inherent motion of the aircraft flying past the map area in very high resolution spotlight (or spot) modes can severely degrade the map resolution if motion compensation is not provided. Range gate closure is a motion compensation technique that compensates for this particular type of motion degradation. Traditional range gate closure apparatus uses time delay circuitry to adjust the listening time, or range gate, of the radar receiver to correspond to the changing aircraft range from the map area. This is referred to as time range gate closure to distinguish it from frequency range gate closure performed by the present invention.

Using the time range gate closure technique, range gate time adjustment is accomplished by incrementally adjusting the start time of a local oscillator (LO) frequency sweep that is used to downconvert radar returns in the receiver. In ASARS and ASARS MTI ground mapping systems manufactured by the assignee of the present invention, the LO sweep start time is adjusted with a coarse digital delay step size of 10 ns in conjunction with a fine analog delay step size of 625 ps. The coarse digital delay has an accuracy of less than 50 ps which is determined by the phase accuracy of the system digital clock. The fine delay is generated by a 4-bit programmable tapped delay line with a nominal step size of 625 ps and a total delay range of 9.375 ns. The 4-bit programmable tapped delay line is capable of generating 16 possible time delays from 0 ns to 9.375 ns in increments of 625 ps. The delay steps are generated by tapping an inductor and capacitor network, then multiplexing the tapped delays with a 16 to 1 analog multiplexer. The manner in which this network is tapped contributes to step size inaccuracies. Also, inductor and capacitor temperature variations and tolerances also contribute to the step size inaccuracies as well as=total delay inaccuracies. The total delay has an inaccuracy of ±600 ps or 12.8% of the step size, and the 625 ps step size of the fine analog delay has an inaccuracy of ±225 ns which is 36% of the step size. Hence, the accuracy of the delay line step size determines the accuracy of the range gate closure motion compensation.

Therefore, it is an objective of the present invention to provide for improved range gate closure circuitry for use in synthetic aperture radars that improves mapping resolution and improves upon conventional time range gate closure techniques.

SUMMARY OF THE INVENTION

In order to meet the above and other objectives, the present invention provides for a frequency range gate closure circuit for use in synthetic aperture radars that incorporate a digital waveform generator or a direct digital synthesizer that improves the mapping resolution of the radars. When a digital waveform generator or direct digital synthesizer is used in the radar, range gate closure motion compensation may be implemented more accurately using the present invention.

The present invention comprises a digital waveform generator or direct digital synthesizer that is clocked by a system clock, and that processes control words corresponding to a desired slope of stretch frequency modulation of transmitted radar signals, and that generates frequency modulated pulse output signals. The range gate closure circuit comprises a digital data accumulator for receiving an increment value and a pulse repetition frequency value of the radar. Logic circuitry is coupled to an output of the digital data accumulator and is coupled to receive a digital modulo threshold signal, and outputs the increment value when it is less than the digital modulo threshold signal every pulse repetition interval. The difference between the digital modulo threshold signal and the increment value is coupled to the digital data accumulator to reset it when the increment value is less than the digital modulo threshold signal. A coarse time delay counter is coupled to the logic circuitry for counting coarse time delays. The frequency range gate closure circuit decrements a frequency offset of a local oscillator frequency sweep by the increment value every pulse repetition interval until the frequency offset is less than the digital modulo threshold signal, so that the frequency offset is equal to the expected Doppler frequency error.

The range gate closure accuracy of a synthetic aperture radar, such as an ASARS MTI system, for example, incorporating a digital waveform generator, or direct digital synthesizer, may be increased to the accuracy of the system digital clock by using the present frequency range gate closure circuit. In the ASARS MTI system, for example, frequency range gate closure is performed digitally in conjunction with the digital waveform generator to dramatically increase the programmable fine step size resolution to 0.492 ps with an accuracy of ±0.246 ps. This is more than a 900 times increase in fine step size accuracy. By using the present frequency range gate closure circuitry, the range gate closure motion compensation accuracy is limited by the accuracy of the coarse digital delay, which is determined by the phase accuracy of the system digital clock (nominally 50 ps). The net result is a 4.5 times increase in range gate closure motion compensation accuracy for SAR spot modes. The present invention may be incorporated into any airborne radar system used for high resolution ground mapping that employs a digital waveform generator.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DESCRIPTION OF THE PREFERRED EMBODIMENTS

Figure 1:
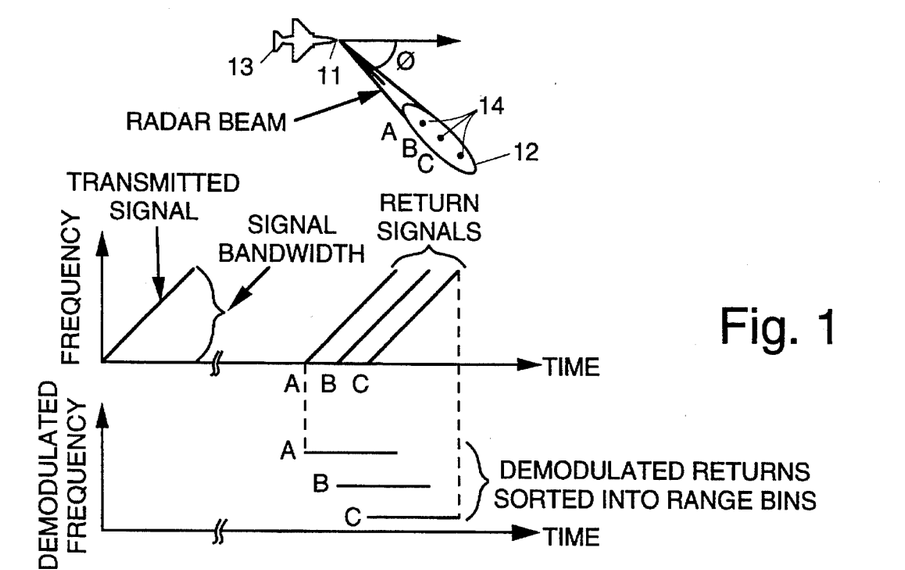
FIG. 1 illustrates stretch range compression in a synthetic aperture radar system.

Referring to the drawing figures, and by way of introduction with reference to FIG. 1, when an airborne synthetic aperture (or array) radar 11 (SAR) is used to provide high resolution ground mapping of a map area 12, uncompensated motion of a radar-bearing aircraft 13 degrades the map resolution. In particular, the inherent motion of the aircraft 13 flying past the map area 12 in very high resolution spotlight (or spot) modes can severely degrade the map resolution if motion compensation is not provided.

Range gate closure is a motion compensation technique used to compensate for this particular type of motion degradation. Traditional range gate closure techniques uses time delay circuitry to adjust the listening time, or range gate, of a radar receiver to correspond to the continually changing aircraft range from the map area 12. This is referred to as time range gate closure. When a digital waveform generator 21 or a direct digital synthesizer 21 (FIG. 6) is incorporated into the radar 11, the range gate closure motion compensation can be implemented more accurately by using a frequency adjustment technique in accordance with the present invention. This technique is referred to as frequency range gate closure.

SAR is a high resolution ground mapping system that takes advantage of the forward motion of the airborne radar 11 to produce an equivalent of a very long side-looking array antenna. Each time a pulse is transmitted, the radar 11 occupies a position further along the flight path. When the returns from each successive transmission are summed together an antenna with a very large aperture is synthesized. By using the present frequency range gate closure technique, very fine azimuth resolution is achieved. Fine range resolution of the map is achieved using stretch range compression.

Stretch range compression is a technique for converting differences in round-trip ranging time to differences in frequency for separate returns from the ground. It is performed by frequency modulating radar transmissions in a linear manner and then removing this modulation from the received signals as shown in FIG. 1. The demodulation of the return signals is performed by modulating a local oscillator (LO) used in the radar receiver downconversion circuitry with the same frequency profile as the transmitted signal. By subtracting a frequency that changes linearly at the same rate as the transmitted pulse, every received pulse is downconverted to a constant intermediate frequency (IF) signal.

FIG. 1 shows that the demodulated returns from a point target 14 are compressed into unique constant frequencies proportional to the range of the target 14 from the aircraft 13. The demodulated returns are then filtered by the range compression filter bank that is usually constructed from a fast Fourier transform (FFT) algorithm in the digital circuitry of the radar 11. Each filter in the filter bank corresponds to a range cell or range bin of the map.

Figure 2A:
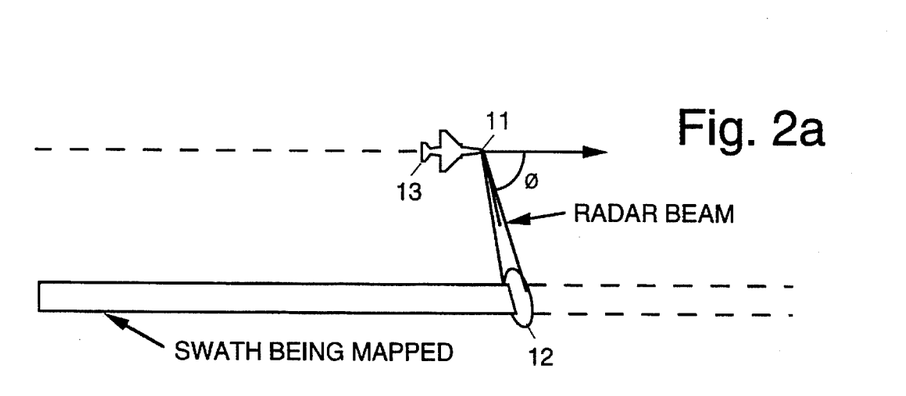
FIGS. 2a and 2b illustrate SAR strip and spot mapping modes.
Figure 2B:
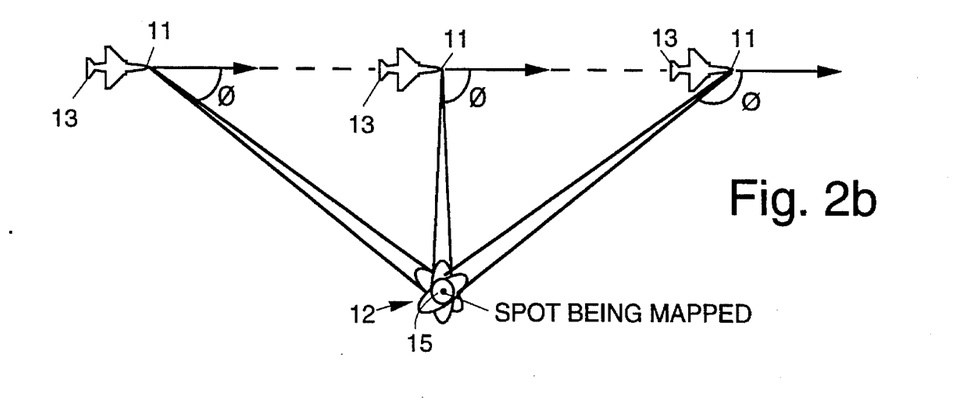

Two modes are commonly used in SAR ground mapping applications. Strip modes are used to collect large amounts of coarse mapping data, and spot modes are used to map a smaller map area 12 in greater detail. Strip maps are generated by flying the aircraft 13 parallel to the map area 12 with its radar antenna held at a fixed look angle, Ø, shown in FIG. 2a. Spot maps are generated by focusing the radar antenna on the desired area to be mapped while collecting data as the aircraft 13 flies by, shown in FIG. 2b.

Figure 3:
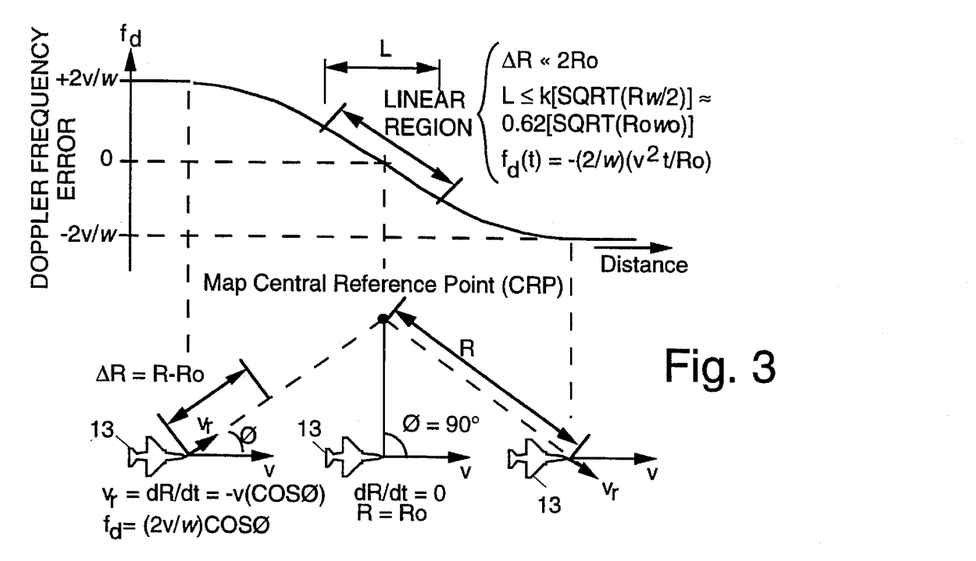
FIG. 3 illustrates central reference point Doppler frequency error.

As the aircraft 13 flies past the map area 12 in spot modes, the velocity of the radar 11 relative to the map area 12 changes along the flight path. Therefore, the radar returns from the ground contain Doppler frequency errors that correspond to aircraft position. These Doppler frequency errors shift the frequency of the radar returns and cause them to be sorted into wrong range bins by the stretch range compression. Thus, in order to place the returns into the proper range bins, it is necessary to reduce the Doppler errors resulting from the aircraft motion. Because the range of the radar 11 from the map area 12 is always be much larger than any cross dimension of a spot map, the range gate closure motion compensation is designed with respect to a map central reference point 15 (FIG. 3). The map is then constructed with respect to the central reference point 15 and range gate closure inaccuracies occurring away from the central reference point 15 are assumed to be negligible.

A Doppler frequency error profile of the central reference point 15 is depicted in FIG. 3. FIG. 3 illustrates that the relative velocity, $v_r$, of the radar 11 relative to the central reference point 15 changes along the flight path as $$v_r = dR/dt = -v \cos(\emptyset) s, \quad (1)$$

where R is the range of the radar 11 to the central reference point 15, dR/dt is the range rate of change, v is the aircraft velocity, and Ø is the radar look angle. The Doppler frequency error $f_d$ of the radar returns from the central reference point 15 is then given by $$f_d = -(2/w)v \cos(\emptyset) \, Hz, \quad (2)$$

where w is the wavelength of the transmitted radar signals.

FIG. 3 also shows that over a restricted length L along the flight path the Doppler frequency error curve may be approximated by a linear function. This linear region is defined where $\Delta R = R - R_0 \leq 2R_0$ or $L \leq 0.62[\text{SQRT}(R_0 w_0)]$, where $R_0$ is the range at which the relative velocity $v_r$ equals zero. Thus, the Doppler error of the central reference point 15 caused by the aircraft motion may be represented by the linear equation $$f_d(t) = -(2/w)(v^2 t/R_0) \, Hz \quad (3)$$

over a limited distance, L, along the flight path.

Figure 4A:
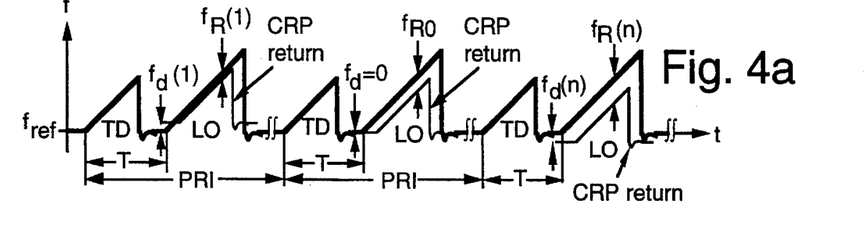
FIGS. 4a–4c illustrate central reference point target returns using conventional, time and frequency range gate closure techniques, respectively.

FIG. 4a illustrates the effect the Doppler frequency error has on the radar returns. FIG. 4a shows that the return from the central reference point 15 of the map has the same linear frequency modulation as the transmitted signal. However, the return is offset by a Doppler frequency that corresponds to the position of the aircraft 13 along the flight path. When the return is demodulated and downconverted to an IF signal by the LO signal, which is frequency swept at the same rate as the transmitted signal, a ranging frequency is determined. The ranging frequency is given by $$f_R(n) = |f_{LO}(n) - f_{CRP}(n)| Hz, \quad (4)$$

where $f_R(n)$ is a constant frequency signal, $f_{LO}(n)$ and $f_{CRP}(n)$ are frequency modulated signals, and n is an integer corresponding to a particular transmit/receive cycle or pulse repetition interval (PRI). The frequency of the central reference point return may be written as $$f_{CRP}(n) = f_{CRP,0} + f_d(n) \text{ Hz}, \quad (5)$$

where $f_{CRP,O}$ is the central reference point return frequency when $R = R_0$, and $f_d(n)$ is the Doppler frequency error of the nth pulse repetition interval. Because $f_d(n)$ decreases on each successive pulse repetition interval, as shown in FIG. 3, $f_R(n)$ increases on each successive cycle, causing the central reference point 15 to be placed into range bins that increase in range as the aircraft 13 traverses the flight path. In order to place the central reference point 15 into the same range bin on each transmit/receive cycle, range gate closure must be used.

Figure 4B:
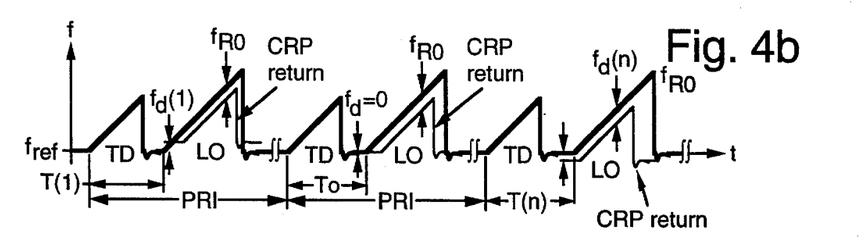
Figure 4C:
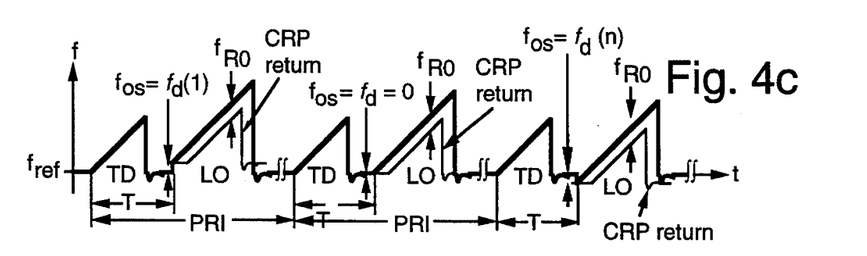

FIG. 4b shows that time range gate closure is implemented by increasing the frequency sweep start time, T(n), of the local oscillator in order to keep the ranging frequency approximately equal to $f_{RO}$ each pulse repetition interval. FIG. 4c illustrates that frequency range gate closure is implemented by setting the local oscillator frequency sweep offset, $f_{OS}$, equal to the expected Doppler error, $f_d(n)$, during each pulse repetition interval, where $$f_d(n) = -(2/w)[v^2 n(PRI)/R_0] \text{ Hz}. \quad (6)$$

Figure 5:
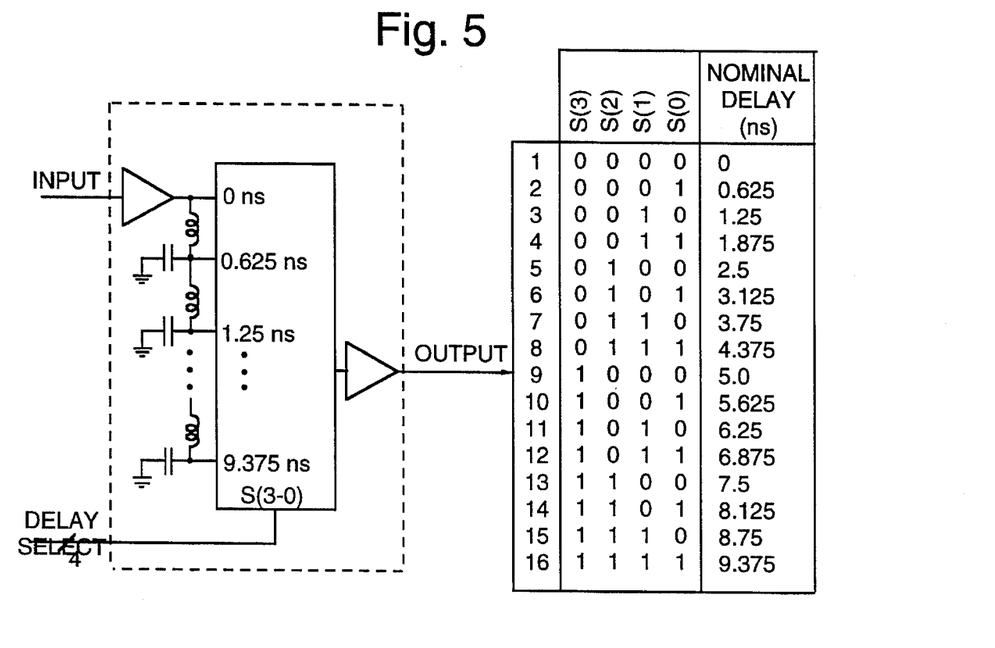
FIGS. 5 shows delays produced by a conventional 4-bit programmable delay line.

Time range gate closure is used in the current ASARS and ASARS MTI ground mapping systems, for example. The local oscillator sweep start time is adjusted with a coarse digital delay step size of 10 ns used in conjunction with a fine analog delay step size of 625 ps. The fine delay is generated by a 4-bit programmable tapped delay line with a nominal step size of 625 ps and a total delay of 9.375 ns, as shown in FIG. 5. This delay line is capable of generating sixteen possible time delays in 625 ps increments from 0 ns to 9.375 ns. The coarse delay is generated by synchronizing the sweep trigger pulse of the local oscillator with the 100 MHz system digital clock.

The programmable delay line step size is accurate to ±225 ps which is 36% of the step size, and the total delay of the delay line is accurate to ±600 ps or 12.8%. The coarse digital delay has an accuracy of less than 50 ps which is determined by the phase accuracy of the 100 MHz system digital clock. Hence, the accuracy of the time range gate closure motion compensation is limited to the 625±225 ps fine delay step size.

Figure 6:
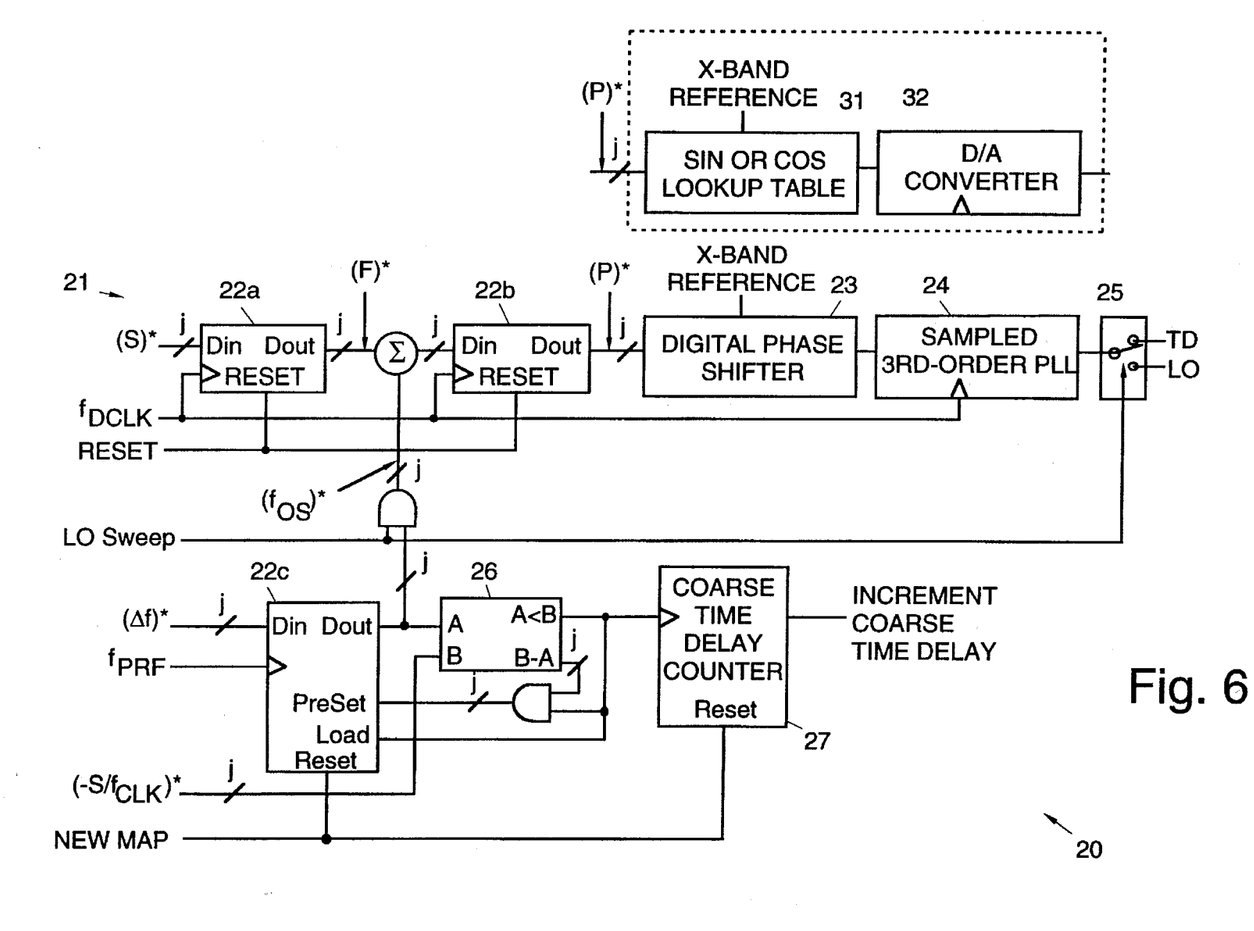
FIG. 6 illustrates frequency range gate closure apparatus in accordance with the principles of the present invention using a digital waveform generator and a direct digital synthesizer.

Referring now to FIG. 6, it illustrates frequency range gate closure circuitry 20 in accordance with the principles of the present invention implemented as a portion of the SAR radar 11 that incorporates a digital waveform generator 21. Alternatively, a direct digital synthesizer 21 may be used in place of the digital waveform generator 21, as is shown in the dashed box in FIG. 6. The digital waveform generator 21 is used in the radar 11 to perform the stretch ranging function, such as in the ASARS MTI ground mapping system, for example, which is illustrated in FIG. 6. The range gate closure motion compensation accuracy can be increased to the accuracy of the system digital clock by using frequency range gate closure circuitry 20 in accordance with the present invention.

FIG. 6 shows the digital waveform generator 21 that is currently used in the ASARS MTI radar 11. The digital waveform generator 21 comprises first and second digital data accumulator 22a, 22b that are coupled by way of a digital phase shifter 23 and a third-order phase locked loop (PLL) 24 to an output switch 25. The output switch 25 is coupled to transmit drive (TD) circuitry 29 and local oscillator (LO) circuitry 28.

FIG. 6 also illustrates frequency range gate closure apparatus in accordance with the principles of the present invention using a direct digital synthesizer 21 shown with reference to the circuitry shown within the dashed box. The synthesizer 21 shown in FIG. 6 is similar to the generator 21 except that a Sin or Cos lookup table 31 and digital to analog (D/A) converter 32 are used in place of the digital phase shifter 23 and phase locked loop 24. Otherwise, the circuits are substantially the same.

Figure 7:
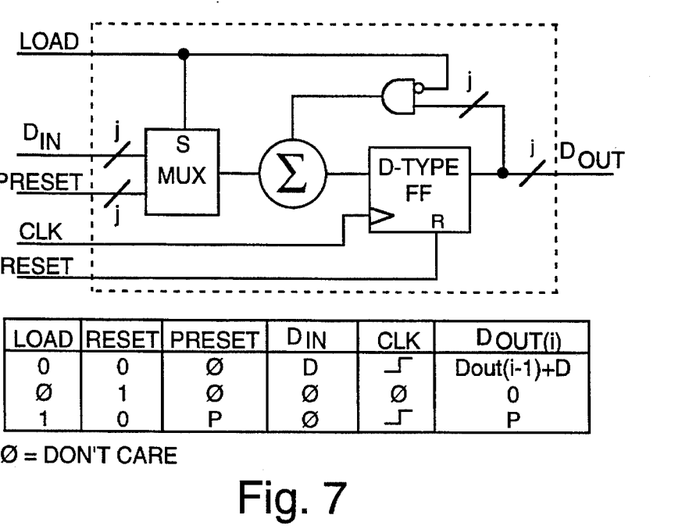
FIG. 7 shows a simplified block diagram of a digital data accumulator used in the frequency range gate closure apparatus of FIG. 6.

Each of the digital data accumulators 22 shown in FIG. 6 are digital circuits that increment its output by the data present at their respective inputs every clock cycle. A simplified block diagram of the digital data accumulator 22 is shown in FIG. 7. The digital data accumulators 22 may be programmed to preset the output to a specific starting value or reset the output to zero, as is shown in FIG. 7 and accompanying truth table.

The digital data accumulators 22a, 22b in the digital waveform generator 21 are used to generate a quadratic phase data progression that is used to digitally shift the phase of an X-band reference signal in the digital phase shifter 23. The phase shifted reference signal is then input to the sampled third-order phase locked loop 24 that is sampled at the same rate as the phase shift data progression. The digital data accumulators 22a, 22b and the third-order phase locked loop 24 form a phase data generator 21a. The phase locked loop 24 acts as a smoothing filter to produce a very linear frequency modulated pulse used for stretch radar compression. The output of the phase locked loop 24 is switched by the output switch 25 between the transmit drive (TD) circuitry 29 that is used to amplify the radar signals for transmission and the local oscillator (LO) circuitry 28 that is used to downconvert the received radar signals (see FIG. 4).

The slope of the stretch frequency modulation is controlled by a j-bit control word (S)*. It may be shown that the control (S)* is a two's complement representation of $$S^* = (2^j / f^2_{DCLK}) S, \quad (7)$$

where j is the number of bits in the phase data generator 21a, $f_{DCLK}$ is the frequency of the digital waveform generator clock, and S is the desired frequency slope. Usually j and $f_{CLK}$ are fixed within a given radar 11 and $f_{DCLK}$ is derived from $f_{CLK}$ (i.e. $f_{DCLK} = f_{CLK} \div y$, where y=1,2, ...) so that the digital control word (S)* is directly proportional to the desired slope S.

For a given control word (S)* applied to the phase data generator 21a, it may be shown that the phase data progression is updated every period of the digital waveform generator clock, $T_{DCLK}$, and is given by the quadratic relation $$P(r) = 0.5 r^2 (S)^*, \quad (8)$$

where r=0, 1, 2, .... Because frequency is equal to the phase rate of change (f= dØ/dt, the frequency data progression can be determined by taking the derivative of the phase data progression with respect to the time increment r. This results in $$F(r) = r(S)^*, \quad (9)$$

which can be shown to be the output of the first digital data accumulator 22a in the phase data generator 21a. Hence, the output of the first digital data accumulator 22a corresponds to frequency. Therefore, a number that remains constant during a frequency sweep, $(f_{OS})^*$, summed into the phase data generator 21a at the output of the first digital data accumulator 22a results in a frequency offset. It can be shown that $(f_{OS})^*$ is the j-bit two's complement representation of $$f_{OS}'=2^j f_{OS}/f_{DCLK}, \quad (10)$$

where $f_{OS}$ is the desired frequency offset.

The frequency range gate closure circuitry 20 is shown in FIG. 6 and represents additional circuitry necessary to perform frequency range gate closure in accordance with the present invention (see FIG. 4b) in the ASARS MTI ground mapping radar 11, for example. The frequency range gate closure circuitry 20 is comprised of an input digital data accumulator 22c that is coupled by way of logic circuitry 26 to a coarse time delay counter 27. The frequency range gate closure circuitry 20 increments the frequency offset $f_{OS}$ of the LO frequency sweep every pulse repetition interval so that $f_{OS}$ is equal to the expected Doppler frequency error $f_d(n)$ given by equation (6) in the linear region of the error curve shown in FIG. 3.

Figure 8:
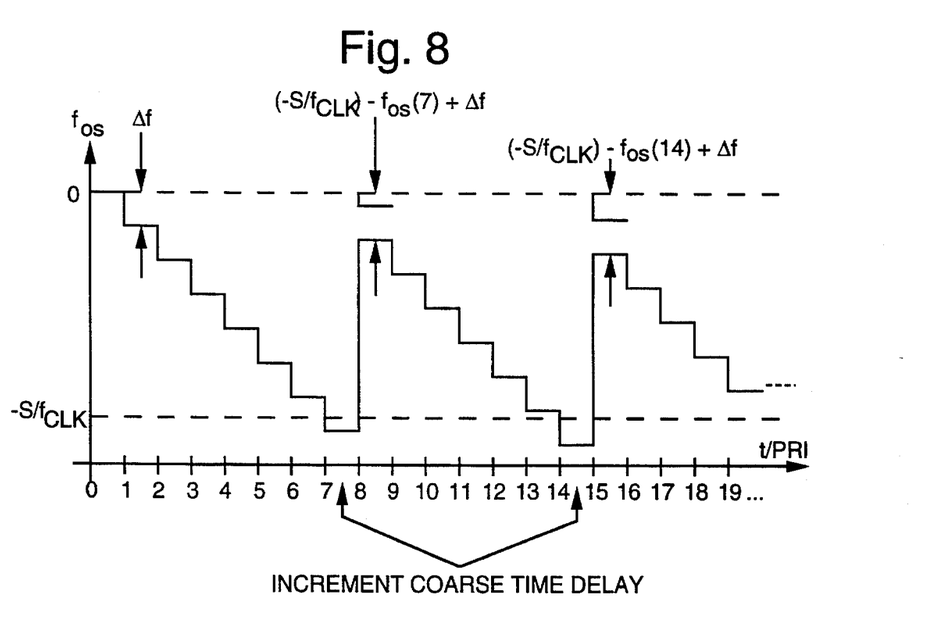
FIG. 8 illustrates frequency offset decrementation performed in the frequency range gate closure apparatus of FIG. 6.

The frequency range gate closure circuitry 20 decrements $(f_{OS})^*$ by $(\Delta f)^*$ every pulse repetition interval until $(f_{OS})^*$ is less than $(-S/f_{CLK})^*$. The j-bit two's complement word $(\Delta f)^*$ represents the frequency increment given by $$\Delta f=(-2/w)(v^2 PRI/R_0) \text{ Hz}, \quad (11)$$

and $(-S/f_{CLK})^*$ is the j-bit two's complement word representing the quantity $-S/f_{CLK}$. When $(f_{OS})^*$ becomes less than $(-S/f_{CLK})^*$ the input digital data accumulator 22c is preset with $[(-S/f_{CLK})^*-(f_{OS})^*]$, the coarse time delay counter 27 that controls the timing between the TD and LO sweeps, is incremented by $1/f_{CLK}$, and the frequency offset progression continues. FIG. 8 shows how the frequency offset decrements $\Delta f$ every pulse repetition interval and how it is modulo with respect to $-S/f_{CLK}$.

Figure 9:
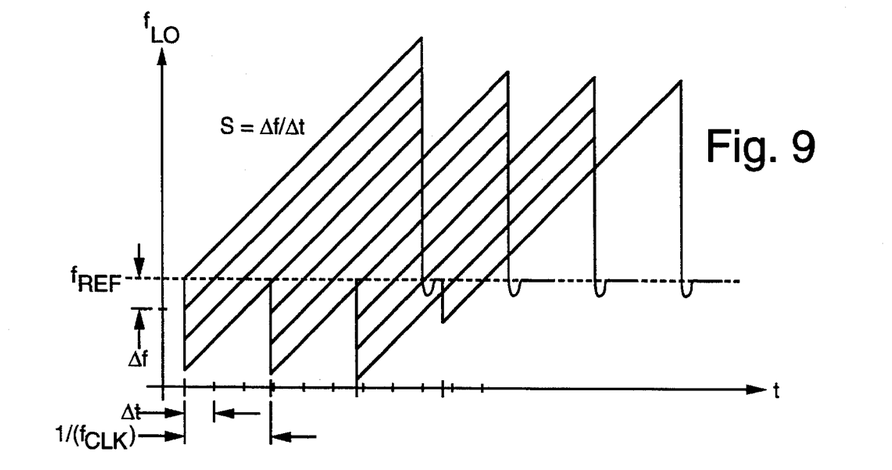
FIG. 9 shows a family of LO sweeps generated by decrementing the frequency offset and incrementing the coarse time delay in the frequency range gate closure apparatus of FIG. 6.

FIG. 9 shows a family of LO sweeps generated by decrementing the frequency offset and incrementing the coarse time delay when necessary. The equivalent time delay increment $\Delta t$ between each LO sweep is constant and equal to $\Delta f/S$. From the relation $\Delta t= \Delta f/S$ time range gate closure and frequency range gate closure are theoretically equivalent techniques for performing range gate closure.

Because the phase shifts applied to the X-band reference signal are modulo $2\pi$, that is $0 \leq \emptyset_{SHIFT} \leq 2\pi$, and the phase shift data progression $(P)^*$ is the j-bit two's complement representation of $P(r)$ given in (8) the phase resolution is given by $$\emptyset_{res}=2\pi/2^j \text{ radians}. \quad (12)$$

Thus, since the smallest phase increment $\emptyset_{res}$ can be updated every clock cycle, the frequency resolution is given by $$f_{res}=\emptyset_{res}/T_{DCLK}=f_{DCLK}/2^j \text{ Hz}. \quad (13)$$

Therefore, it follows from FIG. 9 that $$\Delta t_{res}=f_{res}/S=f_{DCLK}/(S_{min}2^j), \quad (14)$$

where $\Delta t_{res}$ is the fine delay step size for frequency range gate closure and $S_{min}$ is the minimum required frequency slope.

The range gate closure accuracy of the ASARS MTI radar 11, for example, which incorporating the digital waveform generator 21 has been increased to the accuracy of the system digital clock by using the above-described frequency range gate closure circuitry 20. In this radar 11 $f_{CLK}=100$ MHz, $f_{DCLK}=f_{CLK} \div 3=33$ MHz, and $S_{min}=0.5$ MHz/µs, and j=27. Therefore, the fine step size resolution can be reduced to 0.492 ps with a quantization error of ±0.246 ps. This is more than a 900 times increase in fine step size accuracy. Thus, when frequency range gate closure circuitry 20 is used, the range gate closure motion compensation accuracy is limited by the accuracy of the coarse digital delay that is determined by the phase accuracy of the system digital clock (nominally 50 ps). The net result is a 4.5 times increase in range gate closure motion compensation accuracy for SAR spot modes.

Thus there has been described a new and improved range gate closure circuitry for use in synthetic aperture radars that improves mapping resolution and improves upon conventional time range gate closure techniques. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. Apparatus for use with a synthetic aperture radar, said apparatus comprising:

a digital waveform generator means that is clocked by a system clock, and that processes control words corresponding to a desired slope of stretch frequency modulation of transmitted radar signals, for generating frequency modulated pulse output signals; and range gate closure circuitry comprising:

a digital data accumulator for receiving an increment value and a pulse repetition frequency value of the radar;

logic circuitry coupled to an output of the digital data accumulator and coupled to receive a modulo threshold signal, for outputting the increment value when it is less than the modulo threshold signal every pulse repetition interval and for coupling the difference between the modulo threshold signal and the increment value to the digital data accumulator to reset it when the increment value is less than the modulo threshold signal; and a coarse time delay counter coupled to the logic circuitry for counting coarse time delay increments;

and wherein the frequency range gate closure circuitry decrements a frequency offset of the local oscillator frequency sweep by an increment value every pulse repetition interval until the frequency offset is less than the modulo threshold signal and so that the frequency offset is equal to the expected Doppler frequency error.

2. The apparatus of claim 1 wherein the digital waveform generator means comprises a digital waveform generator.

3. The apparatus of claim 1 wherein the digital waveform generator means comprises a direct digital synthesizer.

4. The apparatus of claim 1 wherein the sampled third-order phase locked loop comprises a sampled third-order phase locked loop.

5. The apparatus of claim 1 wherein the digital waveform generator means comprises a digital waveform generator comprising:

first and second serially coupled digital data accumulators; and a digital phase shifter coupled to the second digital data accumulator for generating a quadratic phase data progression that is used to generate a phase shifted reference;

a phase locked loop coupled to the digital phase shifter that is sampled at the same rate as the phase shift, data progression that functions as a smoothing filter to produce a linear frequency modulated pulse used for stretch radar compression, and an output switch coupled to the phase locked loop that switches that between the frequency modulated pulse applied to transmit drive circuitry that is used to amplify the radar signals for transmission and local oscillator circuitry 28 that is used to downconvert the received radar signals.

6. The apparatus of claim 1 wherein the digital waveform generator means comprises a direct digital synthesizer comprising:

first and second serially coupled digital data accumulators; and a lookup table coupled to the second digital data accumulator for generating a quadratic phase data progression that is used to generate a phase shifted reference;

a digital to analog converter coupled to the lookup table that is sampled at the same rate as the phase shift data progression that functions as a smoothing filter to produce a linear frequency modulated pulse used for stretch radar compression, and an output switch coupled to the digital to analog converter that switches that between the frequency modulated pulse applied to transmit drive circuitry that is used to amplify the radar signals for transmission and local oscillator circuitry that is used to downconvert the received radar signals.

* * * * *